US010031691B2

(12) United States Patent
Doerk et al.

(10) Patent No.: US 10,031,691 B2
(45) Date of Patent: Jul. 24, 2018

(54) DATA INTEGRITY IN DEDUPLICATED BLOCK STORAGE ENVIRONMENTS

(71) Applicant: International Business Machines Corporation, Armonk, NY (US)

(72) Inventors: Thomas K. Doerk, Mainz (GB); Itzhack Goldberg, Hadera (IL); Thorsten Muehge, Budenheim (DE); Erik Rueger, Ockenheim (DE); Neil Sondhi, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 14/496,370

(22) Filed: Sep. 25, 2014

(65) Prior Publication Data

US 2016/0092137 A1    Mar. 31, 2016

(51) Int. Cl.
*G06F 3/06* (2006.01)

(52) U.S. Cl.
CPC .......... *G06F 3/0641* (2013.01); *G06F 3/0619* (2013.01); *G06F 3/0673* (2013.01)

(58) Field of Classification Search
CPC .................................................. G06F 3/0641
See application file for complete search history.

(56) References Cited

U.S. PATENT DOCUMENTS

| 8,515,909 B2 | 8/2013 | Anglin et al. |
| 8,533,231 B2 | 9/2013 | Aizman et al. |
| 8,688,926 B2 | 4/2014 | Breakstone et al. |
| 2007/0027818 A1* | 2/2007 | Lofgren .................. G06Q 20/12 705/65 |
| 2010/0077013 A1* | 3/2010 | Clements .......... G06F 17/30156 707/822 |
| 2011/0138144 A1* | 6/2011 | Tamura ................. G06F 3/0608 711/166 |
| 2011/0307683 A1* | 12/2011 | Spackman ........ G06F 17/30156 711/216 |
| 2011/0320865 A1* | 12/2011 | Jain ..................... G06F 11/1088 714/6.22 |

(Continued)

FOREIGN PATENT DOCUMENTS

EP    2063351 A2    5/2009

OTHER PUBLICATIONS

Fu et al., "AA-Dedupe: An Application-Aware Source Deduplication Approach for Cloud Backup Services in the Personal Computing Environment", 2011 IEEE International Conference on Cluster Computing, pp. 112-120, 978-0-7695-4516-5/11, © 2011 IEEE, DOI 10.1109/CLUSTER.2011.20.

(Continued)

*Primary Examiner* — Ryan Bertram
(74) *Attorney, Agent, or Firm* — Isaac J. Gooshaw; Daniel R. Simek; Alexander G. Jochym

(57) ABSTRACT

Methods and apparatuses for maintaining data integrity in deduplicated storage environments. A processor receives a request to write a first block of data to a storage device. A processor compares the first block of data to a second block of data, wherein the second block is stored on the storage device. A processor writes the first block of data to the storage device based, at least in part, on the first block of data matching the second block of data and an amount of pointers to the second block of data being above a predetermined amount.

14 Claims, 6 Drawing Sheets

(56) References Cited

U.S. PATENT DOCUMENTS

| | | | |
|---|---|---|---|
| 2013/0110793 | A1 | 5/2013 | Chavda et al. |
| 2013/0346723 | A1 | 12/2013 | Kawamura |
| 2014/0025917 | A1* | 1/2014 | Kaczmarczyk ..... G06F 11/1448 711/173 |
| 2014/0068184 | A1 | 3/2014 | Edwards et al. |
| 2015/0261792 | A1* | 9/2015 | Attarde ............ G06F 17/30303 707/616 |

OTHER PUBLICATIONS

Nam et al., "Reliability-Aware Deduplication Storage: Assuring Chunk Reliability and Chunk Loss Severity", 978-1-4577-1221-0/11/, © 2011 IEEE.

Nec, Identifying the Hidden Risk of Data Deduplication: How the HYDRAstor (TM) Solution Proactively Solves the Problem, Advanced Storage Products Group, White Paper, pp. 1-9, provided on Main Idea Jul. 2, 2014.

Bhagwat et al., "Providing High Reliability in a Minimum Redundancy Archival Storage System", Proceedings of the 14th IEEE International Symposium on Modeling, Analysis, and Simulation of Computer and Telecommunication Systems (MASCOTS '06), © 2006 IEEE, 9 pages.

Li et al., "Reliability Analysis of Deduplicated and Erasure-Coded Storage", ACM SIGMETRICS Performance Evaluation Review, vol. 38 Issue 3, Dec. 2010, pp. 4-9.

Mojosto, "What is the lifespan of data on a hard drive if the drive is rarely turned on?", Reditt, post submitted on May 8, 2013, 5 pages, <https://www.reddit.com/r/askscience/comments/1dxq7bwhat_is_the_lifespan_of_data_on_a_hard_drive_if/>.

* cited by examiner

US 10,031,691 B2

DATA INTEGRITY IN DEDUPLICATED BLOCK STORAGE ENVIRONMENTS

BACKGROUND OF THE INVENTION

The present invention relates generally to the field of data storage, and more particularly to maintaining data integrity in deduplicated block storage environments.

Data integrity practices help maintain and ensure the accuracy of data in a storage system. Data integrity practices include techniques to prevent data corruption. One form of data corruption is data degradation, also known as data decay or data rot. Data rot is the gradual decay of storage media over time. Data integrity practices include ensuring that the data recorded is maintained as received and, upon later retrieval, ensuring that the data is the same as it was when it was originally recorded. Data integrity practices aim to prevent unintentional changes to information.

Data deduplication is a technique used in data compression for eliminating duplicate copies of repeating data. Data deduplication is used to improve storage utilization and therefore lower storage capacity requirements for a given set of data. In the deduplication process, blocks of data are identified and stored during a process of analysis. As the analysis continues, other blocks are compared to the stored copy. Whenever a match is identified, the redundant block is replaced with a small reference that points, e.g., as a pointer, to the stored block.

SUMMARY

Embodiments of the present invention provide a method, system, and program product to maintain data integrity in deduplicated storage environments. A processor receives a request to write a first block of data to a storage device. A processor compares the first block of data to a second block of data, wherein the second block is stored on the storage device. A processor writes the first block of data to the storage device based, at least in part, on the first block of data matching the second block of data and an amount of pointers to the second block of data being above a predetermined amount.

DETAILED DESCRIPTION

Figure 1:
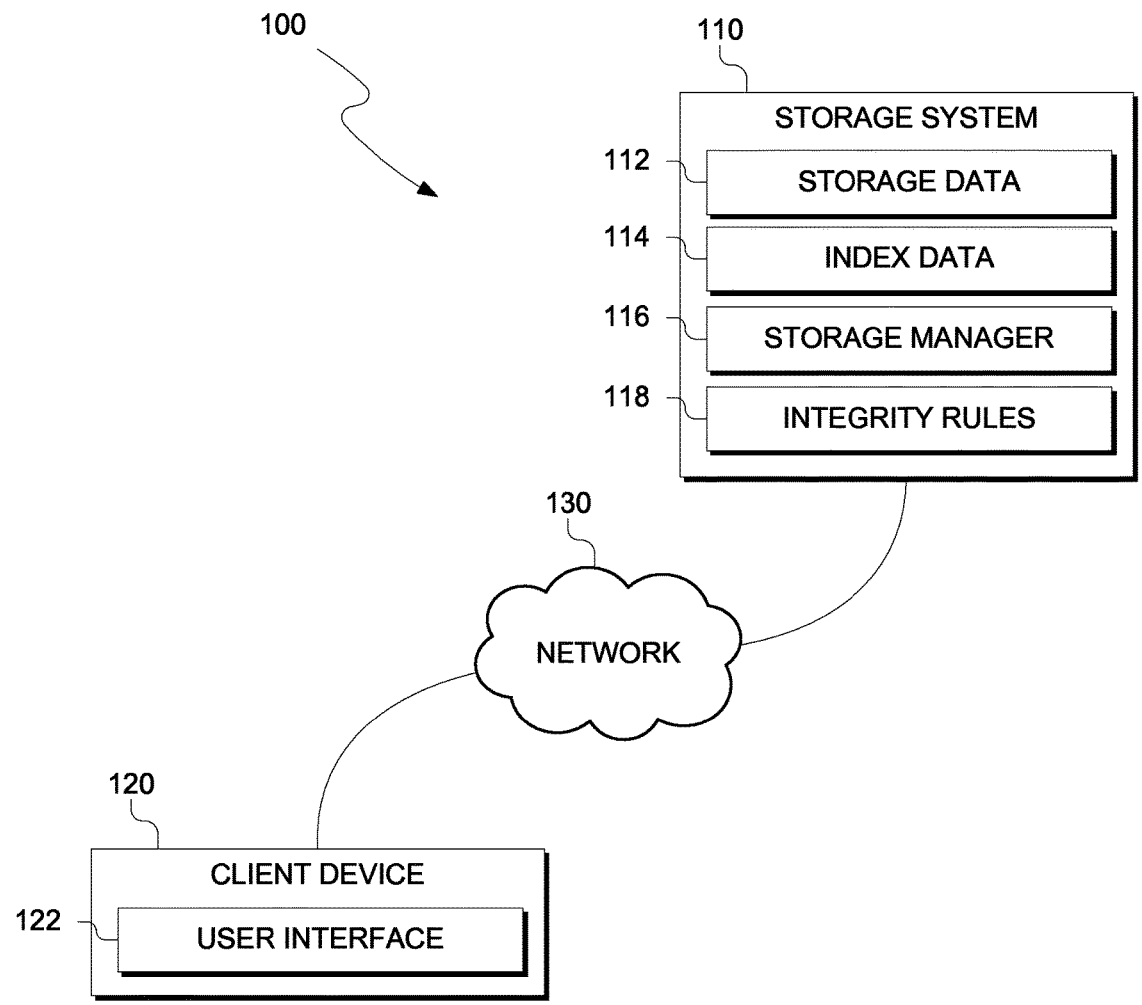
FIG. 1 is a functional block diagram illustrating a storage environment, in accordance with an exemplary embodiment of the present invention.

Known solutions to data deduplication do not take into consideration techniques to mitigate data corruption. Data corruption occurs commonly due to data rot of the information in a storage device. Data rot occurs in a variety of different storage mediums. For example, in magnetic media, such as hard drives, the magnetic orientation of a bit stored on the disk may change over time changing the bit value that was originally written to the storage medium. The change in value causes the data being stored to be in a different state than it was originally received in and therefore makes the data incorrect, which is a state often referred to as corrupt. Data deduplication is a technique used in long term storage solutions, such as data backups. Due to the long term nature of these solutions, data corruption becomes a more prominent issue. Furthermore, since data deduplication solutions store only one instance of a block of data, data corruption of the single instance results in corruption of all files pointing to the corrupted block.

Embodiments of the present invention provide that, by maintaining metrics pertaining to the instances and pointers of deduplicated blocks of data and applying a set of rules based on the metrics, data integrity in a deduplicated storage environment is improved. In various embodiments, multiple instances of blocks of data are stored. By creating multiple instances of the blocks of deduplicated data, a corruption or data loss in one block is mitigated by using another instance of that block. Rules determine when new instances of a block are stored based on predefined or user-defined needs of the data deduplication solution. In various embodiments, existing blocks of data are refreshed by rewriting the block using a newly received copy. By using a new copy of incoming data, any data corruption of the preexisting block is mitigated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating storage environment, generally designated 100, in accordance with one embodiment of the present invention. Storage environment 100 includes storage system 110 and client device 120 connected over network 130. Storage system 110 includes storage data 112, index data 114, storage manager 116 and integrity rules 118. Client device 120 includes user interface 122.

In various embodiments of the present invention, each of storage system 110 and client device 120 is a computing device that can be a standalone device, a server, a laptop computer, a tablet computer, a netbook computer, a personal computer (PC), or a desktop computer. In another embodiment, each of storage system 110 and client device 120 represent, a computing system utilizing clustered computers and components to act as a single pool of seamless resources. In general, each of storage system 110 and client device 120 can be any computing device or a combination of devices with access to storage data 112, index data 114, and integrity rules 118 and that is capable of executing storage manager 116 and user interface 122. Each of storage system 110 and client device 120 may include internal and external hardware components, as depicted and described in further detail with respect to FIG. 6.

In this exemplary embodiment, storage data 112, index data 114, storage manager 116 and integrity rules 118 are stored on storage system 110. In this exemplary embodiment, user interface 122 is stored on client device 120. However, in other embodiments, some or all of storage data 112, index data 114, storage manager 116, integrity rules 118 and user interface 122 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between storage system 110 and client device 120, in accordance with a desired embodiment of the present invention.

In some embodiments, user interface 122 of client device 120 receives input from a user to store a data stream or object in storage system 110. User interface 122 sends a request to storage manager 116 of storage system 110 to store the data stream. Storage manager 116 divides the data stream into blocks or chunks. Storage manager 116 compares a block of the data stream to be stored to one or more blocks of storage data 112. If a block of the data stream does not match any blocks stored in storage data 112, then storage manager 116 stores a copy of the block of the data stream to storage data 112. In addition to storing a copy to storage data 112, storage manager 116 also creates an entry in index data 114 with information describing the block. If a block of the data stream matches a block of data stored in storage data 112, then storage manager 116 retrieves integrity rules 118. Based on the information stored in integrity rules 118 and index data 114, storage manager 116 performs one or more of the following operations: (i) write a pointer to the existing block of storage data 112 in place of storing the incoming block of input data, (ii) write a separate instance of the incoming block of input data in storage data 112 and add a new pointer in index data 114 to the new copy of the block, or (iii) rewrite the existing block of storage data 112 that was matched to the block of the data stream with a rewrite or new instance of the incoming block of the data stream. Storage manager 116 continues comparing the remaining blocks of the data stream. By comparing blocks of an incoming data stream to blocks of storage data 112, storage manager 116 performs inline data deduplication.

In other embodiments, storage manager 116 performs post-process or batch data deduplication. Incoming data streams are written to storage data 112 without determining if similar blocks of data are present. As such, storage data 112 includes data that has yet to be deduplicated. Storage manager 116 stores the addresses of incoming data in index data 114 for data that has not yet been deduplicated. In some embodiments, a user enters a request to perform data deduplication via user interface 122. User interface 122 sends the request to storage manager 116 to perform a post-process data deduplication. In other embodiments, storage manager 116 performs post-process data deduplication automatically based on a predetermined time schedule or the deduplication rate being below a certain level. When storage manager 116 performs a post process data deduplication operation, storage manager 116 splits the data stored in storage data 112 that has yet to be deduplicated, as indicated in index data 114, into blocks or chunks. Storage manager 116 compares the chunked blocks to blocks of data previously deduplicated in storage data 112. If storage manager 116 does not find a match, then storage manager 116 stores a copy of the block of the data stream in storage data 112. In addition to creating a copy in storage data 112, storage manager 116 also creates an entry in index data 114 with information describing the block. If storage manager 116 finds a match, then storage manager 116 retrieves integrity rules 118. Based on the information stored in integrity rules 118 and index data 114, storage manager 116 performs one or more of the following operations: (i) writes a pointer to the existing block of storage data 112 in place of the incoming block of input data, (ii) writes a separate instance of incoming block of input data in storage data 112 and adds a new pointer in index data 114 to the new copy of the block, or (iii) rewrites the existing block of storage data 112 that was matched to the block of the data stream with a rewrite or new instance of the incoming block of the data stream.

In various embodiments, storage data 112 contains data that a user requests to be stored by storage system 110. User interface 122 receives a request from a user to store one or more files or blocks of data on storage system 110. User interface 122 sends the request to storage manager 116. Storage manager 116 receives a request to store incoming data from a user via user interface 122. Storage manager 116 performs data deduplication to the incoming data. In some embodiments, storage manager 116 writes the incoming data to storage data 112 and performs data deduplication at a later time (e.g., post-process). Storage manager 116 splits or chunks into blocks the incoming data (e.g., in-line) or the data of storage data 112 that has not been deduplicated (e.g., post-process). In other embodiments, storage data 112 stores at least of portion of data that is deduplicated. Storage data 112 stores the deduplicated data in chunks or blocks. In some embodiments, the size of blocks stored in storage data 112 is fixed. For example, a block may be sixty-four bits long or four kilobytes long. In other embodiments, the size of blocks stored in storage data 112 and blocks of incoming data is variable. For example, one block of storage data 112 is one megabyte in size while another is 128 kilobytes in size. As another example, the block size is based on the size of the files of the incoming data and is not broken into blocks or sub-file chunks. By varying the level of storage for which a block is generated and compared by, the comparison speed and deduplication rate can be selected to meet the needs of storage system 110. One of ordinary skill in the art will appreciate that any size block, based either on file level or sub-file level splitting, can be used without deviating from the invention. In some embodiments, storage data 112 is compressed to further reduce the amount of storage required for a given set of data. In one embodiment, storage manager 116 compresses incoming blocks of data prior to being written to storage data 112. In another embodiment, storage manager 116 performs a post-process compression to storage data 112.

In some embodiments, storage manager 116 compares incoming data blocks with blocks of deduplicated data of storage data 112. In other embodiments, storage manager 116 generates identifiers, such as a hash value, for the blocks of data stored in storage data 112 and for incoming data blocks. A hash value is a representation of a string of characters or symbols, such as bits or bytes, which represent an arrangement data within a given block of data. In various embodiments, storage manager 116 stores determined hash values for blocks of storage data 112 in index data 114. In other embodiments, storage manager 116 stores a hash value for a block of data in storage data 112. In some embodiments, storage manager 116 determines hash values that are unique for a specific block of data. As such, hash value values and blocks correspond to one another by a one-to-one mapping. Thus, unique hash values for two blocks match only if the content of the two blocks match. A collision occurs when two hash values match but the content that each represents does not. Generally, the length of a hash value is positively correlated to a rate of collisions and negatively correlated with the time required to perform comparisons between hash values. In one embodiment, storage manager 116 determines a first hash value and a second hash value for a block of data, where the first hash value is shorter than the second hash value. If the first hash value of two blocks match, then storage manager 116 compares the larger, second hash values to ensure if the block of incoming data to be stored matches a block of data in storage data 112. Conversely, if the first hash values do not match, then the blocks do not match and storage manager 116 skips comparing the second hash values. In other embodiments, storage manager 116 generates checksums, digital fingerprints or ciphers for the blocks of data stored in storage data 112 and for incoming data streams. Storage manager 116 compares the generated checksums, cyclic redundancy checks, digital fingerprints or ciphers to for the respective incoming block of data to a block of date stored in storage data 112 to determine if a match (i.e. collision) is present. One of ordinary skill in the art will appreciate that, in other embodiments, other methods of mapping of data blocks to functions representing the data block's value are used to aid in comparison of data blocks. Furthermore, one of ordinary skill in the art will appreciate that, in other embodiments, the complexity (e.g., MD5, SHA-1 or SHA-256) or size of a hash value or other identifier (e.g., the length of a hash value and the collision rate) vary to minimize collisions or speed up the comparisons of data blocks. In various embodiments, storage data 112 also contains error correction or error detection coding. In order to determine if data integrity has been comprised, storage manager 116 determines a code using coding schemes such as parity bits, cyclic redundancy checks, checksums, hash functions or Hamming codes in order to evaluate the data integrity of a block of data. One of ordinary skill in the art will appreciate that, in other embodiments, other methods of error correction or detection scheme or code are used to determine if a block of data is corrupt or to correct the corruption.

In various embodiments, storage manager 116 stores information regarding the arrangement of deduplicated data, as stored in storage data 120, in index data 114. For a given instance of a block of data stored in storage data 112, index data 114 stores one or more pointers or memory addresses for the respective blocks of data. For example, when creating a new instance of a block of data in storage data 112, storage manager 116 creates a pointer in index data 114 that indicates the location of the new block of data stored in storage data 112. In other embodiments, index data 114 stores pointers for original instances of a block of data and not the pointers for deduplicated blocks of data. In some embodiments, index data 114 stores metrics associated with a block of data. For example, the metrics include one or more of (i) the number of references or pointers to a block of data (e.g., the number of instances a block of data and other deduplicated blocks of data referencing the block of data), (ii) the time that a block of data was written to storage data 112, (iii) the importance or priority of a block of data, (iv) the frequency of reads or writes to a block of data, or (v) pointers to storage data 112 or references to entries in index data 114 of separate instances of equivalent blocks of data. Based on information stored in integrity rules 118 and metrics stored in index data 114, storage manager 116 performs different procedures or instructions when an incoming block of data matches a block of data of storage data 112. For example, integrity rules 118 may specify that, if a block of data in storage data 112 has a number of references associated with the block above a predetermined threshold, then, storage manager 116 stores a separate instance of the incoming block of data in storage data 112.

In various embodiments, integrity rules 118 include triggers and corresponding instructions for storage manager 116 to perform when performing in-line or post-process data deduplication. Integrity rules 118 include predefined instructions to improve data integrity of deduplicated data stored in storage data 112. In some embodiments, user defined rules are created in integrity rules 118. User interface 122 receives input from a user to create rules and instructions for storage manager 116 to perform when the rule is triggered. For example, a user defines rules using Boolean operators and comparators operations to determine if certain conditions in storage data 112 or index data 114 are present. Based on the conditions of a rules being true, storage manager 116 performs one or more operations based on the rules in integrity rules 118 which is true. In various embodiments, user interface 112 sends the user defined rules to storage manager 116. Storage manager 116 saves the user defined rules in integrity rules 118. Integrity rules 118 include various triggers to execute the corresponding instructions. For example, integrity rules 118 include a rule that is associated with instructions. The rule includes a first trigger that is true in response to storage manager 116 finding a match between an incoming block of data and a block of data previously written to storage data 112. In this example, the rule also includes as a second trigger that the block of data in storage data 112 has a number of references from previous deduplicated blocks of data above a predetermined threshold. Based on both triggers being true, storage manager 116 performs the instructions associated with the rule. In this example, the instructions include writing a new instance of the incoming block of data to storage data 112. A new entry in index data 114 is created with a new pointer, separate from the previous entry that resulted in a match, which points to the newly created instance.

In various embodiments, integrity rules 118 include various triggers to define a rule. For example, integrity rules 118 can trigger instructions based on one or more of the following: (i) the number of pointers or references for a preexisting block of data is above or equal to a predetermined amount, (ii) the priority or importance of a block of data is above or below a threshold, (iii) the frequency of reads or writes of a block of data overall or for a certain period of time, and (iv) the age or the time passed since a block of data was written to storage data 112. The triggers of integrity rules 118 are combined using Boolean operators to create complex triggers based upon which storage manager 116 determines whether to execute instructions. When writing a block of incoming data or analyzing a block in a post process data deduplication request, storage manager 116 compares the block of incoming data and to the blocks of data stored in storage data 112. Based on a match, storage manager 116 retrieves index data 114 related to the matched block of data in storage data 112. Storage manager 116 populates the rules in integrity rules 118 with the retrieved index data 114. Storage manager 116 determines if any rules have triggered. Based on storage manager 116 determining that a rule has triggered, storage manager 116 performs the instructions associated with the triggered rule of integrity rules 118. For example, a rule of integrity rules 118 includes one or more of the following instruction: (i) writing a new separate instance of a block of data in storage data 112, (ii) creating a new entry in index data 114, (iii) overwriting the block of data in storage data 112 with the incoming block of data, (iv) overwriting the has value of index data 114 with a hash value generated from the incoming block of data, (v) linking entries of index data 114, and (vi) redirecting pointers of an entry in index data 114 to a new or different block of data in storage data 112.

Figure 2:
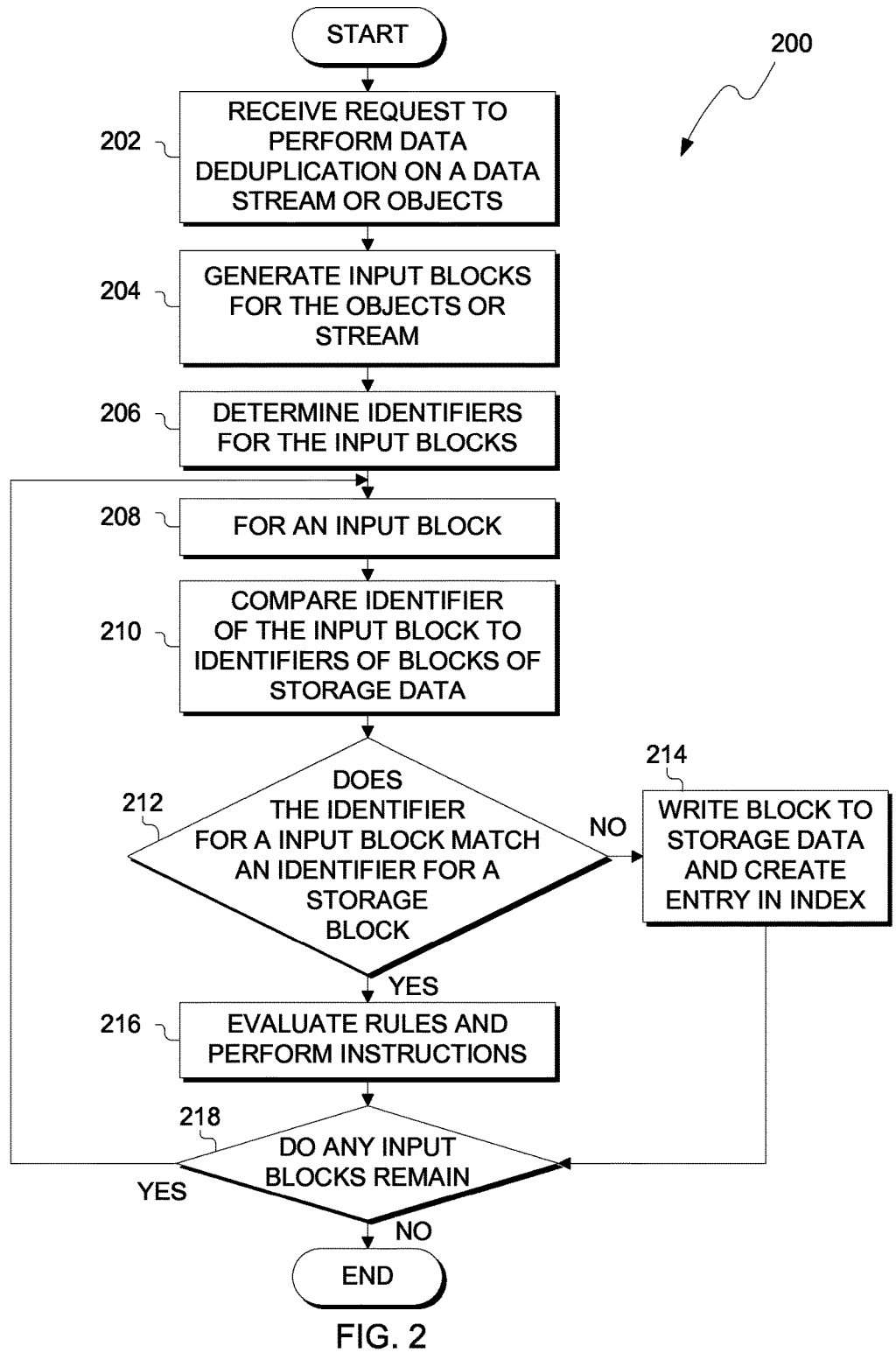
FIG. 2 illustrates operational processes of a storage manager, on a computing device within the environment of FIG. 1, in accordance with an exemplary embodiment of the present invention.

FIG. 2 is a flowchart illustrating operational processes, generally designated 200, of storage manager 116 for performing data deduplication, on a computing device within the environment of FIG. 1, in accordance with an exemplary embodiment of the present invention.

In process 202, storage manager 116 receives a request to perform data duplication for an incoming data stream (e.g., in-line) or one or more objects (e.g., post-process). In some embodiments, a user of client device 120 inputs a request via user interface 122 to store data on storage system 110. User interface 122 sends the request to storage manager 116 to perform data deduplication to the incoming stream of data of the request. In other embodiments, storage manager 116 initiates the request to perform data deduplication on one or more objects stored in storage data 112. The one or more objects include files that have yet to be deduplicated within storage data 112.

In process 204, storage manager 116 generates input blocks for the objects or stream by splitting the incoming data stream or objects into blocks for data deduplication. In some embodiments, the blocks are fixed in size. In other embodiments, the blocks vary in size. In such embodiments, storage manger 116 compares an input block to blocks of storage data 112 (process 210). If no match is found, then storage manager 116 changes the size of the block to determine if another match can be found. In other embodiments, storage manager 116 analyzes the incoming data stream or objects to determine the size of the blocks. For example, storage manager 116 determines that portions of a header in a file contain similar information with other file headers (such as an author's username for a file) and creates blocks of the size of similar information to perform data deduplication on.

In process 206, storage manager 116 determines identifiers for the input blocks. For example, identifiers include hash values, checksums, cyclic redundancy checks, digital fingerprints or ciphers that represent the content of a block of data. In some embodiments, the generated identifier is globally unique for a given block of data (e.g., an identifier represents one arrangement of information for a given block of data). In other embodiments, the identifier represents multiple blocks of data (e.g., collisions are present) and is not globally unique. In such embodiments, a direct comparison of the blocks is used or a globally unique identifier is used to ensure a match of information has occurred.

In process 208, storage manager 116 performs the following processes for one input block at a time. For a given input block, storage manager 116 compares the input block to blocks of data in storage data 112 (process 210). Based on a match being determined in process 210, storage manager 116 will evaluate integrity rules 118 to determine which instructions or operations to perform in order to increase data integrity of the blocks of data of storage data 112 (process 216). If storage manager 116 does not find a match, then storage manager 116 writes the input block to storage data 112 (process 214). Storage manager 116 repeats the foregoing processes for any remaining input blocks (process 218).

In process 210, storage manager 116 compares the identifier of an input block to one or more identifiers of blocks of data of storage data 112. In some embodiments, the identifiers from blocks of storage data 112 as stored in index data 114. In other embodiments, the identifiers are stored with the blocks of data in storage data 112. In process 212, storage manager 116 determines if a match occurs between the input block a block of storage in storage data 112 (process 212). If no match is found ("no" branch of process 212), then storage manager 116 writes the input block to storage data 112 and creates an entry in index data 114 (process 214). Storage manager 116 creates an entry in index data 114 with a pointer or memory address to the newly written block of input data and, in some embodiments, the identifier determined in process 206. In other embodiments, storage manager 116 writes the identifier in storage data 112 with the input block.

If storage manager 116 determines a match between the identifier of the input block and the identifier of a block of storage data ("yes" branch of process 212), then storage manager 116 evaluates rules stored in integrity rules 118 and performs the instructions of any rules that are triggered (process 216). Based on metrics and information stored in index data 114, storage manager 116 populates rules with the information to determine which operations should be performed to the input block, storage data 112, and/or index data 114. For example, based on a rule stored in integrity rules 118, storage manger 116 evaluates the number of pointers a block of data in storage data 112 is referenced by. If the number of pointers is above or equal to a certain amount, then storage manager 116 writes a new instance of the input block in storage data 112 as opposed to creating a deduplicated pointer reference to the matched block in storage data 112. Storage manager 116 also adds a new reference to index data 114 indicating the memory address the newly created separate instance resides in storage data 112. This allows storage manager 116 to use either instance in case one becomes corrupt. On the other hand, in this example, if the number of deduplicated pointer references is below the certain amount, storage manger 116 writes the incoming input block as a pointer reference in storage data 112. Storage manager 116 also increases a reference count stored in index data 114 associated with the block of storage data 112 that matched the incoming, and now deduplicated, input block. For a more detailed discussion of integrity rules 118, triggers and instructions are each discussed in further detail herein. In process 218, Storage manager 116 determines if any remaining input blocks are to be processed based on the request received in process 202. If any additional input blocks are to be processed ("yes" branch of process 218), then process manager proceeds to process 208 and repeats the process for the input block. If no more additional input blocks are to be processed ("no" branch of process 218), then storage manger 116 has processed the request and waits for other requests.

Figure 3:
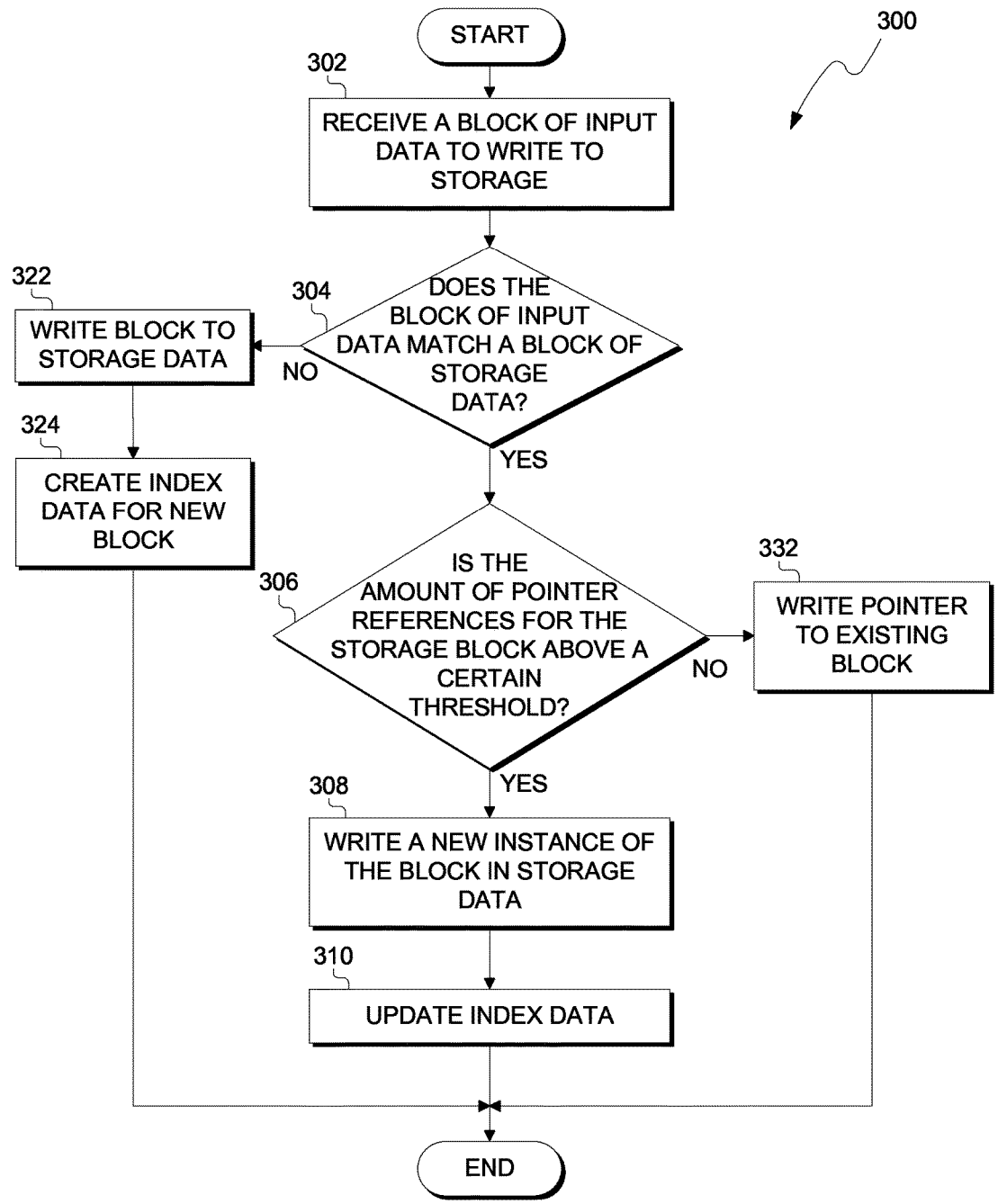
FIGS. 3, 4 and 5 illustrate example flowcharts of maintaining data integrity for data deduplication in accordance with embodiments of the present invention.
Figure 4:
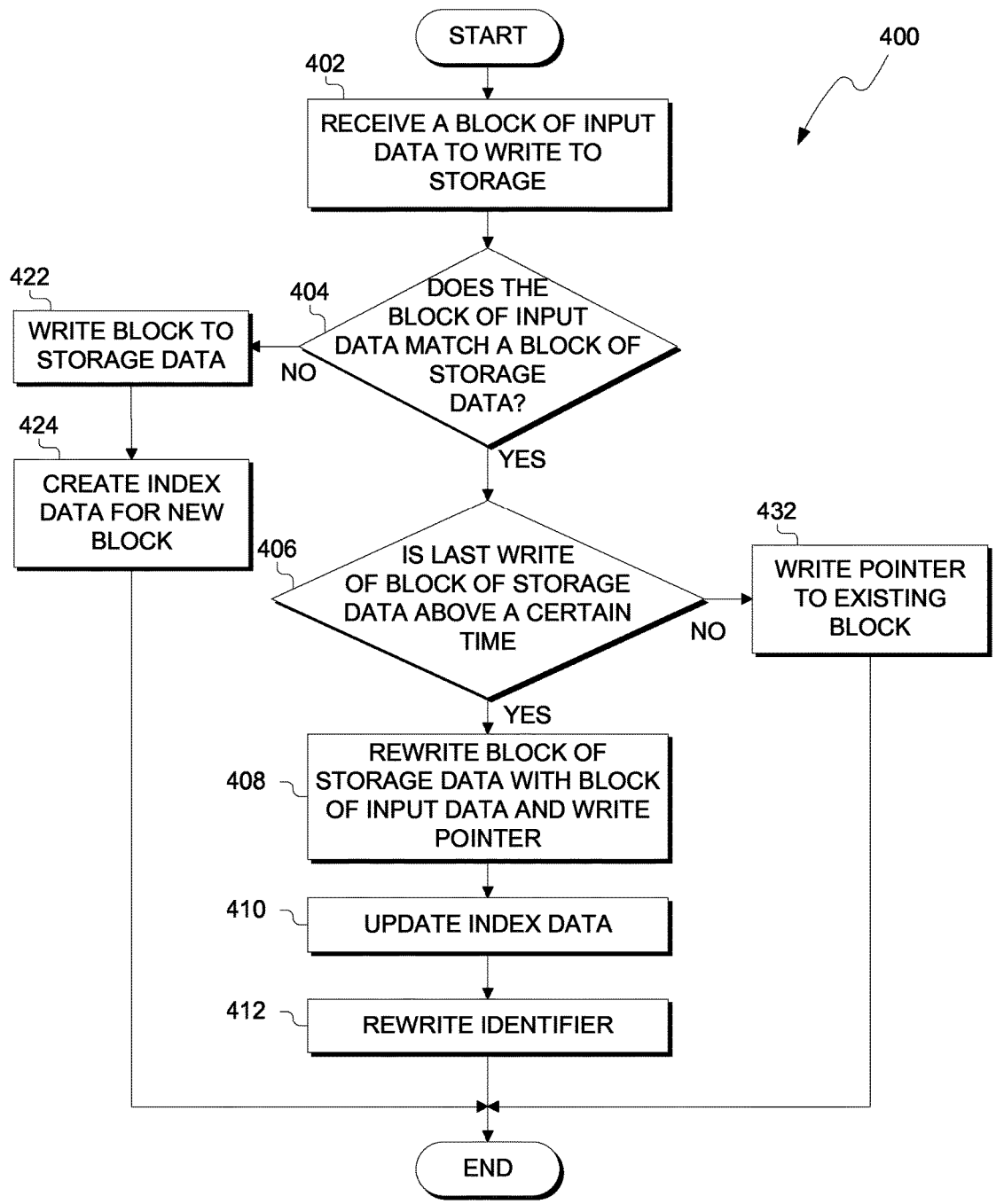
Figure 5:
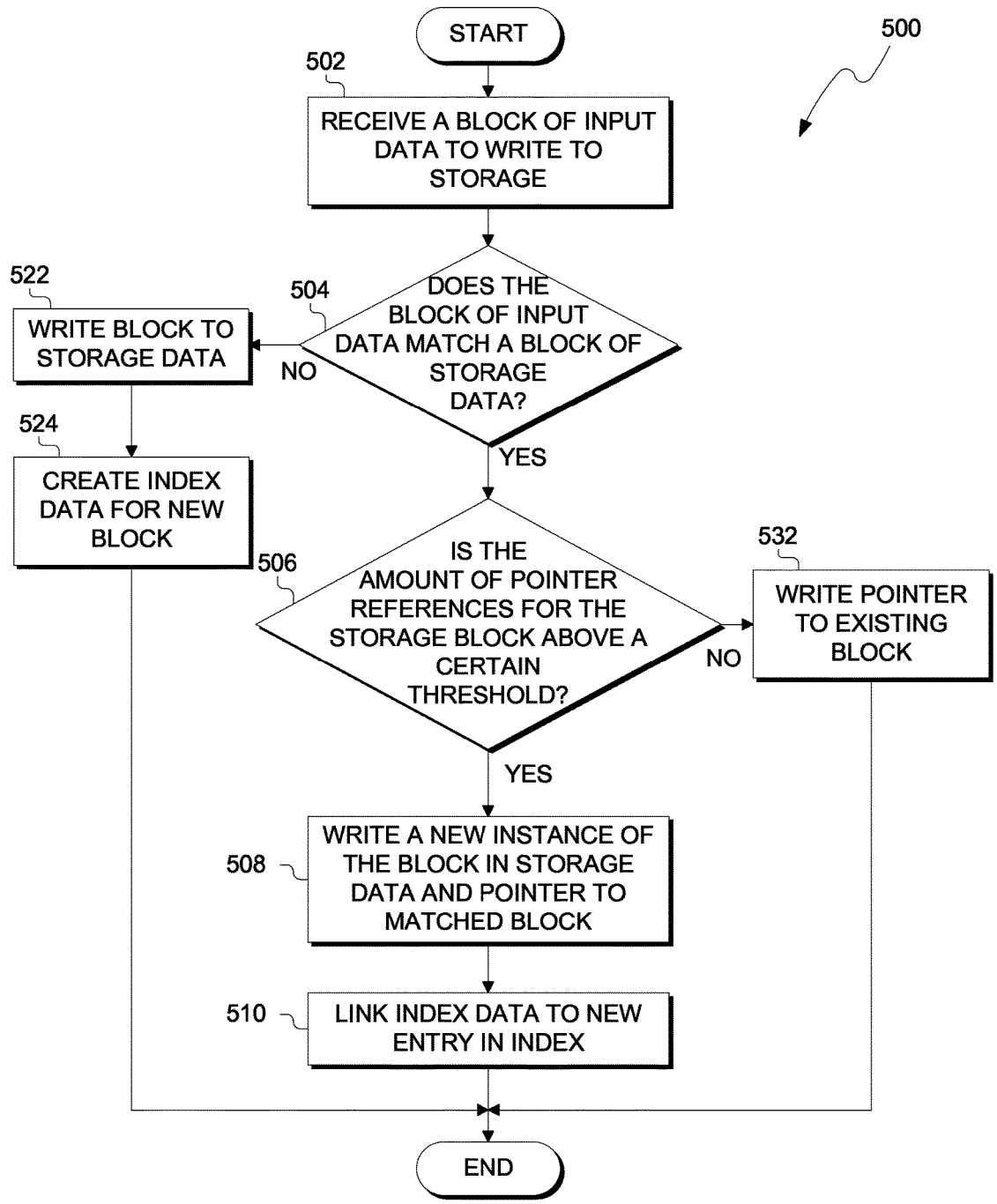

FIGS. 3, 4 and 5 illustrate example operations of storage manager 116. The foregoing discussions are non-limiting examples of rules for integrity rules 118 of entries for index data 114. One of ordinary skill in the art will appreciate that any combination of the following examples can be used to maintain data integrity in a data deduplication storage environment.

FIG. 3 illustrates an example flowchart, generally designated 300, of maintaining data integrity for data deduplication in accordance with an embodiment of the present invention.

Example flowchart 300 illustrates an example data deduplication process for maintaining data integrity. In this example, integrity rules 118 includes a first rule to store a new instance of a block of incoming data when matches of block of storage data 112 and the block of storage data 112 has a number of pointers in index data 114 equal to or above a certain threshold. Integrity rules 118 includes a second rule to store an additional pointer in storage data 112 for a corresponding block of storage data 112 has a number of pointers below the same threshold. In some embodiments, the second rule is incorporated into the first rule by using an if-then-else structure.

Example flowchart 300 illustrates storage manager 116 implementing the above rules. In process 302, storage manager 116 receives a block of data to be written to storage data 112. In process 304, storage manager 116 compares the incoming block of data received in process 302 to one or more blocks of data currently stored in storage data 112. In some embodiments, storage manager 116 compares identifiers (e.g., hash values) of blocks of data in storage data to an identifier of the incoming data block. If no match is found ("no" branch of process 304), then storage manager 116 writes the incoming block of data to storage data 112 (process 322). Storage manager 116 creates an entry in index data 114 with a pointer to the location in storage data 112 (process 324). In some embodiments, storage manager 116 creates additional information in the entry, such as a count of pointers associated with a block of data in storage data 112.

If storage manager 116 does find a block of storage in storage data 112 which matches the incoming block of data ("yes" branch of process 304), then storage manager 116 evaluates the rules stored in integrity rules 118 (process 306). In this example, storage manager 116 evaluates if the number of pointers referring to a block of data in storage data 112 is above a certain threshold (process 306). For example, the threshold is set to ten pointers for a block of data. As such, when an incoming block to be deduplicated with a block of data with ten pointers which represents blocks of data previously deduplicated, then storage manager 116 performs the instructions associated with the rule. If the number of pointers are below the threshold, ("no" branch of process 306), then storage manager 116 writes a pointer to the matched block of data to storage data 112 (process 332). By writing the pointer, storage manager 116 deduplicates the incoming block of input data when writing the pointer in storage data 112. In various embodiments, storage manager 116 increases the count of pointer in index data 114 associated with the matched block of data.

If storage manager 116 determines the number of pointers is above the threshold ("yes" branch of process 306), then storage manager 116 writes a new instance of the incoming block to storage data 112 (process 308). By doing so, storage manager 116 does not deduplicate the incoming block of data and, as such, multiple instances of the block of data are now present in storage data 112. If one of the multiple instances becomes corrupt or lost, then storage manager 116 is able to retrieve another instance to ensure data integrity. In various embodiments, storage manager 116 uses the block of data as received from the incoming block instead of the existing block that was matched. By doing so, storage manager 116 uses a correct copy of the block of data as, due to data rot, the existing block of data may be corrupt. In process 310, storage manager 116 updates index data 114 of the matched block to indicate that a new instance has been created and creates a pointer in index data 114 and links the instances to indicate the location of the new instance created in process 308. When later requests to write an incoming block to storage data 112 are received, storage manager 116 creates pointers to the new instance of the block for incoming blocks. Once the number of pointers reaches the threshold for the new instance, storage manager 116 stores another instance of the incoming block. By creating multiple instances with a limited amount of pointers, storage manager 116 mitigates any corruptions that may occur over the life of the block's storage.

FIG. 4 illustrates an example flowchart, generally designated 400, of maintaining data integrity for data deduplication in accordance with an embodiment of the present invention.

Example flowchart 400 illustrates a data deduplication process for maintaining data integrity. In this example, integrity rules 118 includes a first rule to rewrite the original instance of a block of data in storage data 112 when the date and/or time the original block of data was written to storage data 112 exceeds a certain time period. Integrity rules 118 includes a second rule to create an additional pointer in storage data 112 for a corresponding block of storage data 112 was last written at a time period smaller than the time period.

Example flowchart 400 illustrates storage manager 116 implementing the above rules. In process 402, storage manager 116 receives a block of data to be written to storage data 112. In process 404, storage manager 116 compares the incoming block of data received in process 402 to one or more blocks of data currently stored in storage data 112. In some embodiments, storage manager 116 compares identifiers (e.g., hash values) of blocks of data in storage data to an identifier of the incoming data block. If no match is found ("no" branch of process 404), storage manager 116 writes the incoming block of data to storage data 112 (process 422). Storage manager 116 creates an entry in index data 114 with a pointer to the location in storage data 112 (process 424). In this example, storage manager 116 creates additional information in the entry in the form of the date and/or time the block of storage was created or last updated or written to.

If storage manager 116 does find a block of storage in storage data 112 which matches the incoming block of data ("yes" branch of process 404), then storage manager 116 evaluates the rules stored in integrity rules 118 (process 406). In this example, storage manager 116 retrieves the date and/or time the matched block was written to or last modified in storage data 112. Storage manager 116 determines if the time since the last write of the matched block of data exceeds a certain time. If the block of data was written under the time period ("no" branch of process 406), then storage manger 116 performs deduplicates the incoming block of data and writes a pointer to the matched block previously written in storage data 112 (process 432).

If storage manager 116 determines the matched block of data was written or modified over a certain time period ("yes" branch of process 406), then storage manager 116 rewrites the matched block of data using the block of incoming data received in process 402 (process 408). Since the information was matched based on identifiers in process 404, the blocks of data may differ (e.g., data rot has occurred in the previously written block). By using the input block of data, storage manager 116 ensures that the single instance of data is correct and therefore improves data integrity since the previously written block may be corrupt. Storage manager 116 then creates a pointer in storage data 112 to represent the incoming block of data. In process 410, storage manager 116 updates index data with the current date and/or time that the rewrite occurred in process 408. In process 412, storage manager 116 rewrites the identifier used to match the incoming block to the previously written block. By rewriting the single instance of data, in this example on the last time the data was written or in other embodiments based on any metric stored in index data 114, storage manager 116 ensures data integrity without creating multiple instances of a block of data. As such, the life of the block of data is extended without requiring additional storage.

FIG. 5 illustrates an example flowchart, generally designated 500, of maintaining data integrity for data deduplication in accordance with an embodiment of the present invention.

Example flowchart 500 illustrates an example data deduplication process for maintaining data integrity. In this example, integrity rules 118 includes a first rule to store a new instance of a block of incoming data when matches of block of storage data 112 and the block of storage data 112 has a number of pointers in index data 114 equal to or above a certain threshold. Integrity rules 118 includes a second rule to store an additional pointer in storage data 112 for a corresponding block of storage data 112 has a number of pointers below the same threshold. In some embodiments, the second rule is incorporated into the first rule by using an if-then-else structure.

Example flowchart 500 illustrates storage manager 116 implementing the above rules. In process 502, storage manager 116 receives a block of data to be written to storage data 112. In process 504, storage manager 116 compares the incoming block of data received in process 502 to one or more blocks of data currently stored in storage data 112. In some embodiments, storage manager 116 compares identifiers (e.g., hash values) of blocks of data in storage data to an identifier of the incoming data block. If no match is found ("no" branch of process 504), storage manager 116 writes the incoming block of data to storage data 112 (process 522). Storage manager 116 creates an entry in index data 114 with a pointer to the location in storage data 112 (process 524). In some embodiments, storage manager 116 stores additional information in the entry, such as a count of pointers associated with a block of data in storage data 112.

If storage manager 116 does find a block of storage in storage data 112 which matches the incoming block of data ("yes" branch of process 504), then storage manager 116 evaluates the rules stored in integrity rules 118 (process 506). In this example, storage manager 116 evaluates if the number of pointers referring to a block of data in storage data 112 is above a certain threshold (process 506). For example, the threshold is set to five pointers for a block of data. As such, when an incoming block to be deduplicated with a block of data with five pointers which represents blocks of data previously deduplicated, then storage manager 116 performs the instructions associated with the rule. As discussed later, the threshold amount in this example increases with each new instance written to storage data 112. If the number of pointers are below the threshold, ("no" branch of process 506), then storage manager 116 writes a pointer to the matched block of data to storage data 112 (process 532). By writing the pointer, storage manager 116 deduplicates the incoming block of input data when writing the pointer in storage data 112. In various embodiments, storage manager 116 increases the count of pointer in index data 114 associated with the matched block of data.

If storage manager 116 determines the number of pointers is above the threshold ("yes" branch of process 506), then storage manager 116 writes a new instance of the incoming block to storage data 112 (process 508). In comparison to example flowchart 300 in FIG. 3, storage manager 116 writes a new instance of the incoming block of data. However, storage manager 116 also writes the incoming block as a pointer to storage data 112. By doing so, storage manager 116 both deduplicates the incoming block of data and writes a pointer to the matched block. As such, multiple instances of the block of data are now present in storage data 112 in addition to a pointer to the original block of data. If one of the multiple instances becomes corrupt or lost, then storage manager 116 is able to retrieve another instance to ensure data integrity.

In various embodiments, storage manager 116 uses the block of data as received from the incoming block instead of the existing block that was matched. By doing so, storage manager 116 uses a correct copy of the block of data as, due to data rot, the existing block of data may be corrupt. In process 510, storage manager 116 links index data 114 of the matched block to indicate that a new instance has been stored. When later requests to write an incoming block to storage data 112 are received, storage manager 116 writes pointers to the original block for all incoming write requests.

Once the number of pointers reaches the threshold for the new instance, storage manager 116 stores another instance of the incoming block. By creating multiple instances with a limited amount of pointers, storage manager 116 mitigates any corruptions that may occur over the life of the block's storage. In this example, integrity rules 118 include an instruction to increase the threshold for each subsequent instance stored. For example, the rule includes an instruction to increase the threshold by a fixed amount when a new instance is written. Given the threshold starts at five pointers and the threshold is to be increased by five for each instance, storage manager 116 writes a new instance when the amount of pointers reach five. After the new instance is written, the threshold is increased to ten for the second instance stored, fifteen for the third and so on. In other embodiments, the threshold may be increased by a predetermined factor (e.g., doubled for each instance). By increasing the number of pointers required for each new instance, storage manager 116 can increase the data integrity while limiting the number of extra instances stored.

Figure 6:
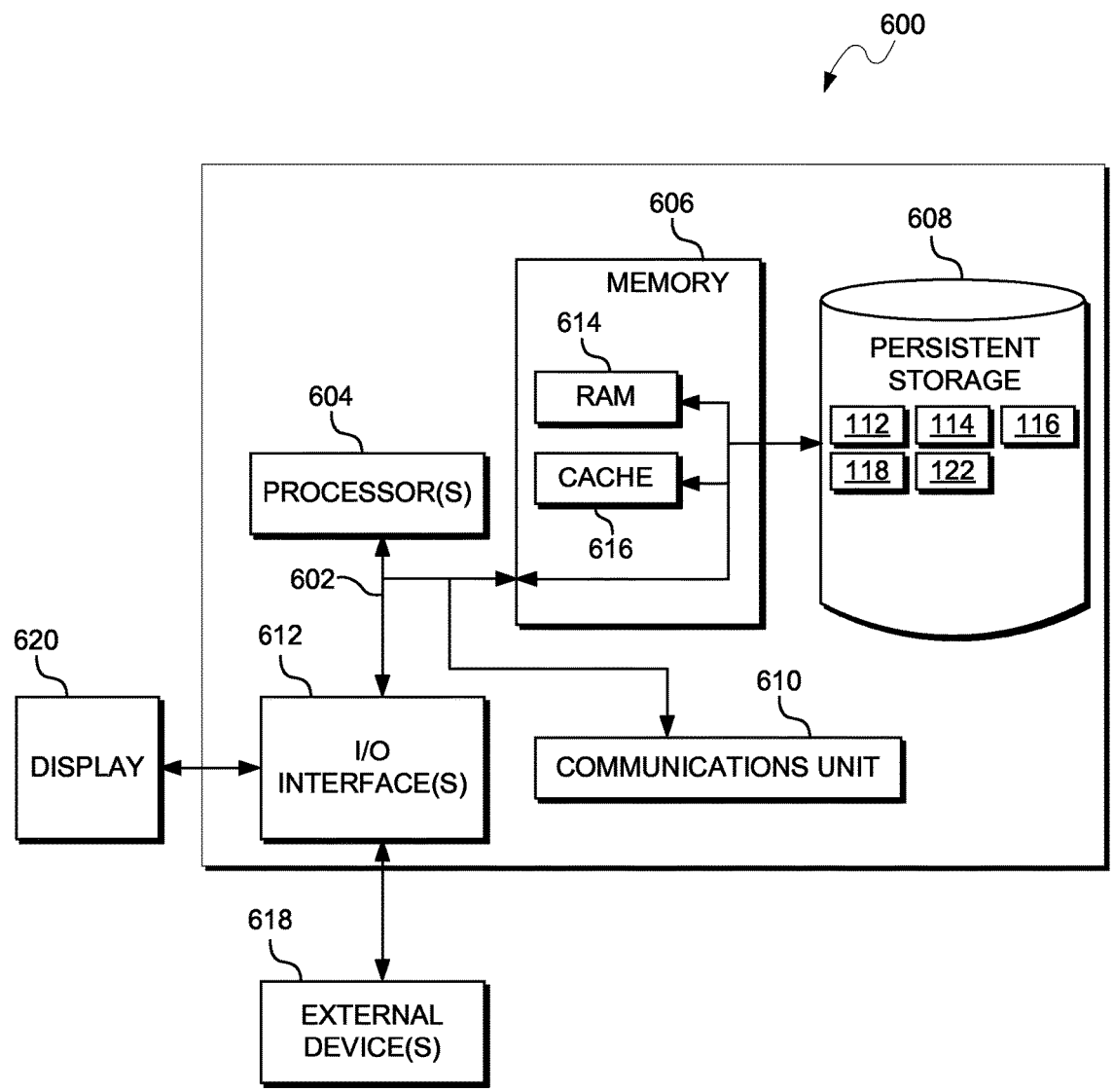
FIG. 6 depicts a block diagram of components of an analytics device executing the operational processes of FIG. 2, in accordance with an exemplary embodiment of the present invention.

FIG. 6 depicts a block diagram, 600, of components of each of storage system 110 and client device 120 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Storage system 110 and client device 120 each include communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Storage data 112, index data 114, storage manager 116, integrity rules 118 and user interface 122 are each stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 130. In these examples, communications unit 610 includes one or more network interface cards. Communications unit 610 may provide communications through the use of either or both physical and wireless communications links. Storage data 112, index data 114, storage manager 116, integrity rules 118 and user interface 122 may be each downloaded to persistent storage 608 through communications unit 610.

I/O interface(s) 612 allows for input and output of data with other devices that may be connected to each of storage system 110 and client device 120. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., storage data 112, index data 114, storage manager 116, integrity rules 118 and user interface 122, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method of maintaining data integrity in deduplicated storage environments, the method comprising:
    receiving, by one or more processors, a request to write a first block of data to a storage device;
    comparing, by the one or more processors, the first block of data to a second block of data, wherein (i) the second block is stored on the storage device; and (ii) the second block of data comprises a deduplicated block of data from the storage device; and
    writing, by the one or more processors, the first block of data to the storage device based, at least in part, on (i) the first block of data matching the second block of data and (ii) a time the second block was written to the storage device, wherein the first block of data is stored as an additional copy of the second block of data.

2. The method of claim 1, wherein the step of writing the first block of data to the storage device is further based, at least in part, on a frequency of reads or writes to the second block of data.

3. The method of claim 2, wherein the step of writing the first block of data to the storage device further comprises:
    writing over, by the one or more processors, the second block of data with the first block of data.

4. The method of claim 1, wherein the step of comparing the first block of data to a second block of data is based, at least in part, on a first identifier of the first block of data and a second identifier of the second block of data.

5. The method of claim 4, wherein the step of writing the first block of data to the storage device further comprises:
    writing over, by the one or more processors, the second identifier with the first identifier.

6. A computer program product for maintaining data integrity in deduplicated storage environments, the computer program product comprising:
    one or more computer-readable storage media and program instructions stored on the one or more computer-readable storage media, the program instructions comprising:
        program instructions to receive a request to write a first block of data to a storage device;
        program instructions to compare the first block of data to a second block of data, wherein (i) the second block is stored on the storage device; and (ii) the second block of data comprises a deduplicated block of data from the storage device; and
        program instructions to write the first block of data to the storage device based, at least in part, on (i) the first block of data matching the second block of data and (ii) a time the second block was written to the storage device, wherein the first block of data is stored as an additional copy of the second block of data.

7. The computer program product of claim 6, wherein the program instructions of writing the first block of data to the storage device is further based, at least in part, on a frequency of reads or writes to the second block of data.

8. The computer program product of claim 7, wherein program instructions to write the first block of data to the storage device further comprises:
    program instructions to write over the second block of data with the first block of data.

9. The computer program product of claim 6, wherein program instructions to compare the first block of data to a second block of data is based, at least in part, on a first identifier of the first block of data and a second identifier of the second block of data.

10. The computer program product of claim 9, wherein program instructions to write the first block of data to the storage device further comprises:
    program instructions to write over the second identifier with the first identifier.

11. A computer system for maintaining data integrity in deduplicated storage environments, the computer system comprising:
    one or more computer processors;
    one or more computer readable storage media; and
    program instructions stored on the computer readable storage media for execution by at least one of the one or more processors, the program instructions comprising:
        program instructions to receive a request to write a first block of data to a storage device;
        program instructions to compare the first block of data to a second block of data, wherein (i) the second block is stored on the storage device; and (ii) the second block of data comprises a deduplicated block of data from the storage device; and
        program instructions to write the first block of data to the storage device based, at least in part, on (i) the first block of data matching the second block of data and (ii) a time the second block was written to the storage device, wherein the first block of data is stored as a separate instance than the second block of data wherein the first block of data is stored as an additional copy of the second block of data.

12. The computer system of claim 11, wherein the program instructions of writing the first block of data to the storage device is further based, at least in part, on a frequency of reads or writes to the second block of data.

13. The computer system of claim 12, wherein program instructions to write the first block of data to the storage device further comprises:

program instructions to write over the second block of data with the first block of data.

14. The computer system of claim 11, wherein program instructions to compare the first block of data to a second block of data is based, at least in part, on a first identifier of the first block of data and a second identifier of the second block of data.

\* \* \* \* \*